March 31, 1970     A. KOLOZSVARY     3,503,101

FASTENING APPARATUS

Filed June 21, 1968

INVENTOR
ARPAD KOLOZSVARY

BY Pennie, Edmonds,
Morton, Taylor & Adams
ATTORNEYS

United States Patent Office 3,503,101
Patented Mar. 31, 1970

3,503,101
FASTENING APPARATUS
Arpad Kolozsvary, Wharton, N.J., assignor to American Velcro, Inc., a corporation of New Hampshire
Filed June 21, 1968, Ser. No. 738,953
Int. Cl. A44b 17/00, 21/00, 13/00
U.S. Cl. 24—204                                    8 Claims

ABSTRACT OF THE DISCLOSURE

Fastening apparatus for releasably joining sheet members under tensile stress wherein fastening members are secured to either sheet member, each fastening member including spaced apart portions having inwardly and outwardly facing surfaces, the inwardly facing surface of one portion of each fastening member defined by a plurality of hooking elements and the outwardly facing surface of each other portion defined by a plurality of complementary hooking elements; one portion of either fastening member is receivable between a portion of the other fastening member and the hooking elements on the inwardly facing surfaces of either fastening member are engageable with complementary hooking elements on the respective opposing outwardly facing surfaces of the other fastening member when the respective fastening members are forced together in face-to-face relationship.

BACKGROUND OF THE INVENTION

This invention relates to an apparatus for releasably joining sheet members under tensile stress. More particularly, this invention relates to a fastener construction wherein means are provided releasably to join components of frame-supported, suspended, or air-inflated tension structures.

In recent years, the commercial availability of strong, impervious sheet materials, mostly plastic-coated fabrics, has lead to the wide spread use of economical tension structures. Presently, the skin surfaces of these tension structures comprise single, continuous sheets which are made generally by adhesive bonding or heat sealing smaller sections and which unitary construction makes exceedingly difficult the fabrication, packing and field erection of large structures.

Accordingly, tension structure skins which could be assembled from smaller sheets would make handling easier and would permit the assembly of structures of various sizes because of flexibility of choice in the number of sheets utilized. However, no fastening means presently available is suitable for use in releasably joining sheets used as tension structure skins because of the requirements of quick releasibility, substantial tensile strength, and the additional requirement of imperviousness to air in the case of inflated structures.

SUMMARY OF THE INVENTION

The fastening apparatus of the present invention is particularly suitable for releasably joining sheet members under tensile stress and comprises first and second fastening members secured to either sheet member. Each fastening member includes first and second spaced apart portions, each portion having an inwardly facing surface and an outwardly facing surface. The inwardly facing surface of each first portion is defined by a plurality of upstanding hooking elements of flexible resilient material and the outwardly facing surface of each second portion is defined by a plurality of upstanding complementary hooking elements of flexible resilient material. The second portion of either fastening member is receivable between the first and second portions of the other fastening member and a large number of hooking elements on the inwardly facing surfaces of the first portions of either fastening member are engageable with a large number of complementary hooking elements on the respective opposing outwardly facing surfaces of the second portion of the other fastening member when the fastening members are forced together in face-to-face relationship to constitute bonds which resist separation by tensile forces acting on the joined sheet members but which are readily separable by peeling forces applied substantially normal to the interfacial planes of engagement.

The present invention utilizes hook and loop fasteners such as those described in U.S. Patents Nos. 2,717,437 and 3,009,235 which include separable members each comprising a sheet of woven fabric having raised loop threads of synthetic material wherein the loops of one tape member are cut at their outer extremities to form hooks while the loops of the other tape member remain uncut. It is also contemplated that a given member may comprise both hooks and loops. When the two members of the fasteners are pressed together in face-to-face relationship, there is substantial engagement of hook threads with loop threads. A considerable effort must be applied to separate the members unless they are peeled apart. In that event, the members may be separated quite easily.

The present invention has the advantages of durability and convenience of operation. In addition, the present fastening apparatus provides a releasable connection between sheet members which actually increases in strength as the tension upon the joined members increases, a condition which would tend to shear the interfacial engagement of known hook and loop fastener configurations. In fact, the shear strength of the present fastening apparatus which includes at least two interfacial planes of engagement is in excess of twice the shear strength of two ordinary single fasteners. Particular embodiments of the present invention may be provided with means preventing fluid passage through the interfacial plane of engagement, a feature which is essential in the case of air-inflated tension structures.

DESCRIPTION OF THE PREFERRED EMBODIMENT

Figure 1:
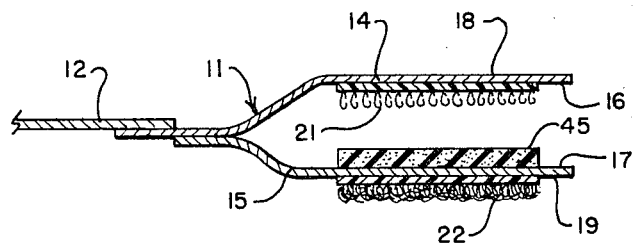
FIG. 1 is a cross section of a fastening member of the present fastening apparatus.

Fastening apparatus of the present invention comprises a first fastening member 11 which is secured to a marginal portion of a sheet member 12 by stitching or other suitable means. The first fastening member 11 includes first and second spaced apart portions 14, 15 each of which has an inwardly facing surface 16, 17, respectively, and an outwardly facing surface 18, 19, respectively. The inwardly facing surface 16 of the first portion 14 of the first fastening member 11 is defined by a plurality of upstanding hooking elements 21 of flexible resilient material.

The hooking elements 21 are raised loop threads of synthetic material such as superpolyamide which are cut at their outer extremities to form hooks as shown in the present embodiment or may be closed loops. The outwardly facing surface 19 of the second portion 15 of the first fastening member 11 is defined by a plurality of upstanding complementary hooking elements 22 of flexible resilient material. The complementary hooking elements 22 are raised loop threads of synthetic material such as superpolyamide which are closed loops as shown in the present embodiment but which may be cut at their outer extremities to form hooks. While hook-type hooking elements 21 have been provided on the inwardly facing surface 16 of the first portion 14 of the first fastening member 11 and loop-type hooking elements 22 have been provided on the outwardly facing surface 19 of the second portion 15 of the first fastening member 11, it is intended that they may be interchanged and thus hooks provided on the outwardly facing surface 19 of the second portion 15 and loops on the inwardly facing surface 16 of the first portion 14. In fact, it is contemplated that a given surface may comprise both hook-type and loop-type hooking elements.

A second fastening member 31, identical in construction to the first fastening member 11, is secured to a marginal portion of a second sheet member 32 by stitching or other suitable means. The second fastening member 31 includes first and second spaced apart portions 34, 35 each of which has an inwardly facing surface 36, 37, respectively, and an outwardly facing surface 38, 39, respectively. The inwardly facing surface 36 of the first portion 34 of the first fastening member 31 is defined by a plurality of upstanding hooking elements 41 of flexible resilient material which is raised loop threads of synthetic material such as superpolyamide, cut at their outer extremities to form hooks as shown in the present embodiment, but which may be closed loops. The outwardly facing surface 39 of the second portion 35 of the second fastening member 31 is defined by a plurality of upstanding complementary hooking elements 42 of flexible resilient material which are raised loop threads of synthetic material such as superpolyamide, shown as closed loops in the present embodiment, but which may be cut at their outer extremities to form hooks. As in the case of the hooking elements 21 and complementary hooking elements 22 of the first fastening member 11, it is contemplated that the hooks and loops may be interchanged and thus hooks provided on the outwardly facing surface 39 of the second portion 35 and loops on the inwardly facing surface 36 of the first portion 34. Again, it is also contemplated that a given surface may comprise both hook-type and loop-type hooking elements.

Figure 2:
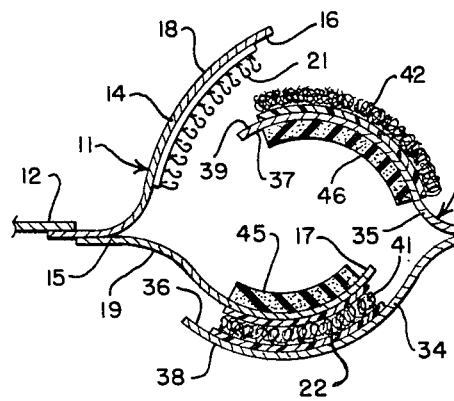
FIG. 2 is a cross section of the present fastening apparatus wherein the respective fastening members are interlocked but not completely engaged.

As best shown in FIG. 2, the second portions of either fastening member respectively, are receivable between the first and second portion of the other fastening member. When the fastening members 11, 31 are aligned in this manner, a large number of hooking elements 21, 41 on the inwardly facing surfaces 16, 36 of the first portion 14, 34 of either fastening member are engageable with a large number of complementary hooking elements 42, 22 on the respective opposing outwardly facing surface 39, 19 of the second portion 35, 15 of the other fastening member when the fastening member 11, 31 are forced together in face-to-face relationship. The elements 21, 42 and 22, 41, so engaged, constitute bonds which secure the marginal portion of the sheet members 12 and 32 and resist separation by tensile forces acting on the jonied sheet members 12, 32. However, the elements 21, 42 and 22, 41 may be separated readily by peeling forces applied to substantially normal to the respective interfacial planes of engagement.

Figure 3:
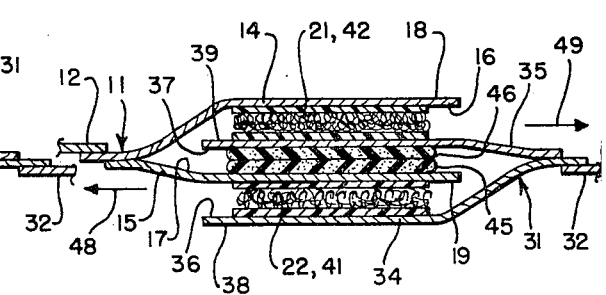
FIG. 3 is a cross section of the present fastening apparatus wherein the respective fastening members are engaged.

In the case of air-inflated structures which require a fluid-tight joint, the present fastening apparatus may be modified wherein the inwardly facing surface 17, 37 of each fastening member 11, 31 is defined by compressible material 45, 46 such as rubber, polyurethane, or other compressible elastomer. As shown best in FIG. 3, the surfaces of compressible material 45, 46 are forced against each other when the hooking elements 21, 41 and the inwardly facing surfaces 15, 36 the first portions 14, 34 of of either fastening member and the complementary hooking elements 22, 42 on the respective opposing outwardly facing surfaces 19, 39 of the second portions 15, 35 of the other fastening member are forced together in face-to-face relationship. The surfaces of compressible material 45, 46, so engaged, provides a seal which prevents fluid passage through the interfacial plane of engagement when the respective fastening members 11, 31 are subjected to tensile stress. The fluid-tight engagement between the surfaces of compressible material 45, 46 is attributable to the tendency of the laterally displaced interfacial planes of engagement between the respective hooking elements and complementary hooking elements to draw toward a central plane, in this case the interfacial plane of engagement betwen the compressible surfaces 45, 46, when the respective fastening members 11, 31 are in tension as shown by arrows 48 and 49. Alternatively, a single elastomeric insert may be provided between the respective inwardly facing surfaces 17, 37 to achieve the same result.

Figure 4:
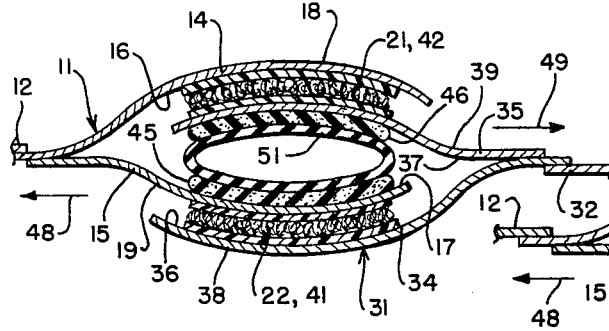
FIG. 4 is a cross section of the present fastening apparatus having a member of oval cross section interposed between opposing surfaces of the respective fastening members.
Figure 5:
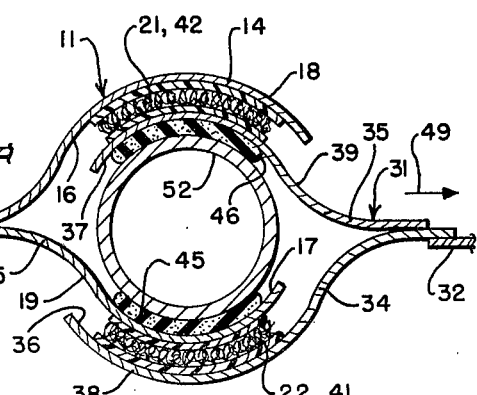
FIG. 5 is a cross section of the present fastening apparatus having a member of circular cross section interposed between opposing surfaces of the respective fastening members.

It has also been observed that the tendency of the joined surfaces of the respective fastening members to be drawn toward the central plane results in a lateral compression or increase of normal force on the respective interfacial planes of engagement which inherently increases the structural strength of the respective joints. This phenomenon may be accentuated by including between the surfaces of compressible material 45, 46, means for constraining the engaged surfaces of the respective fastening members in an arcuate contour such as an elongated member of oval cross section 51 as shown in FIG. 4 or an elongated member of circular cross section 52 as shown in FIG. 5. The elongated member 51 or 52 may be a flexible rubber or plastic tube or, in many instances, a tubular member of a supporting frame of a tension structure which is of sufficient strength and rigidity to support the joined sheet members 12, 32.

Figure 6:
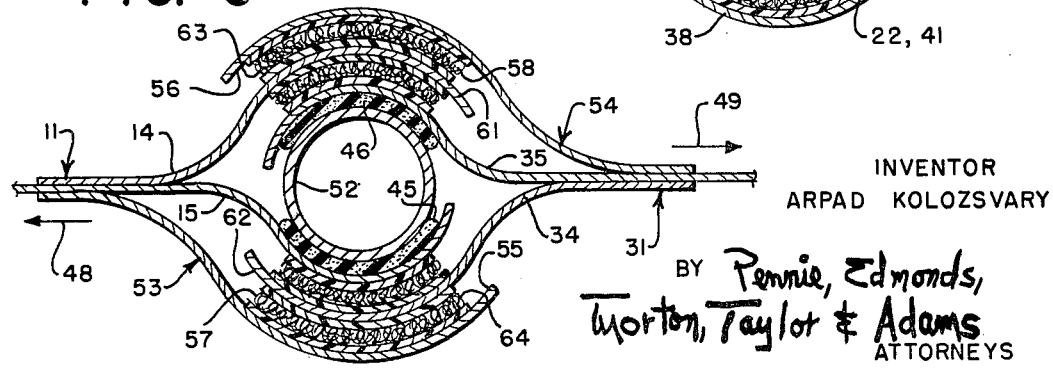
FIG. 6 is a cross section of an alternate embodiment of the present fastening apparatus.

As shown in FIG. 6, an alternative embodiment of the present fastening apparatus which is particularly suitable for more rigorous applications further includes third spaced apart portions 53, 54 secured to the fastening members 11, 31, respectively, adjacent the second portion 15, 35. Inwardly facing surfaces 55, 56 of each third portion 53, 54 of the respective fastening members 11, 31 are defined by a plurality of upstanding hooking elements 57, 58 of flexible resilient material which in the present embodiment are raised loop threads of synthetic material such as superpolyamide, cut at their outer extremities to form hooks. Outwardly facing surfaces 61, 62 of each first portion 14, 34 of the respective fastening members 11, 31 are defined by a plurality of upstanding complementary hooking elements 63, 64 which are raised loop threads of flexible resilient material such as superpolyamide in the form of closed loops. As noted previously, it is intended that the hook-type hooking elements and loop-type hooking elements be interchanged and thus hooks provided on the outwardly facing surface 61, 62 of each first portion 14, 34 and loops provided on the inwardly facing surfaces 55, 56 of each third portion 53, 54. Again, it is further contemplated that a given surface may comprise both hook-type and loop-type hooking elements.

The first portions of either fastening member are receivable between the second and third portions of the other fastening member. The respective fastening members having been arranged in this manner, a large number of hooking elements 57, 58 on the inwardly facing surfaces 55, 56 of the third portions 53, 54 of either fastening member are engageable with a large number of complementary hooking elements 64, 63 on the respective opposing outwardly facing surfaces 62, 61 of the other fastening member when the fastening members 11, 31 are forced together in face-to-face relationship. The elements 57, 64 and 58, 63, so engaged, constitute bonds which resist separation by tensile forces acting on the joined sheet members 11, 31 but which may be separated readily by peeling forces applied substantially normal to their respective interfacial planes of engagement.

I claim:

1. Fastening apparatus for releasably joining sheet members under tensile stress comprising first and second fastening members secured to either sheet member, each fastening member including first and second spaced apart portions, each portion having an inwardly facing surface and an outwardly facing surface, the inwardly facing surface of each first portion defined by a plurality of upstanding hooking elements of flexible resilient material and the outwardly facing surface of each second portion defined by a plurality of upstanding complementary hooking elements of flexible resilient material; the second portions of either fastening member being receivable between the first and second portions of the other fastening member, and a large number of hooking elements on the inwardly facing surfaces of the first portions of either fastening member being engageable with a large number of complementary hooking elements on the respective opposing outwardly facing surfaces of the second portions of the other fastening member when the fastening members are forced together in face-to-face relationship to constitute bonds which resist separation by tensile forces acting on the joined sheet members but which are readily separable by peeling forces applied substantially normal to the interfacial plane of engagement.

2. Fastening apparatus according to claim 1 wherein the inwardly facing surface of the second portion of each fastening member is defined by compressible material, the surfaces of compressible material being forced against each other when the hooking elements on the inwardly facing surfaces of the first portions of either fastening member and the complementary hooking elements on the respective opposing outwardly facing surfaces of the second portions of the other fastening member are forced together in face-to-face relationship to provide a seal which prevents fluid passage through the interfacial plane of engagement of the compressible surfaces when the fastening members are subjected to tensile stress.

3. Fastening apparatus according to claim 2 further including means interposed between the surfaces of compressible material for constraining the engaged surfaces of the respective fastening members in an arcuate contour to increase the resistance of the bonds against separation when the joined sheet members are under tensile stress.

4. Fastening apparatus according to claim 3 wherein the means for constraining the engaged surfaces of the respective fastening members in an arcuate contour is an elongated member.

5. Fastening apparatus according to claim 4 wherein the elongated member is circular in cross section.

6. Fastening apparatus according to claim 5 wherein the elongated member is oval in cross section.

7. Fastening apparatus according to claim 4 wherein the elongated member is of sufficient strength to support the joined sheet members.

8. Fastening apparatus according to claim 1 wherein each fastening member further includes a third spaced apart portion adjacent the second portion, the inwardly facing surface of each third portion defined by a plurality of upstanding hooking elements of flexible resilient material and the outwardly facing surface of each first portion defined by a plurality of upstanding complementary hooking elements; the first portions of either fastening member being receivable between the second and third portions of the other fastening member and a large number of hooking elements on the inwardly facing surfaces of the third portions of either fastening member being engageable with a large number of complementary hooking elements on the respective opposing outwardly facing surfaces of the first portions of the other fastening member when the fastening members are forced together in face-to-face relationship.

References Cited

UNITED STATES PATENTS

| | | | |
|---|---|---|---|
| 1,913,507 | 6/1933 | Öhrström | 24—204 |
| 2,717,437 | 9/1955 | De Mestral | 161—65 |
| 3,128,476 | 4/1964 | Lash. | |
| 3,130,111 | 4/1964 | Izumi | 161—48 |
| 3,383,738 | 5/1968 | Fox et al. | |
| 3,403,429 | 10/1968 | Smith | 24—204 |
| 3,405,430 | 10/1968 | Sidelman | 24—204 |
| 3,421,188 | 1/1969 | Rock | 24—204 |

STEPHEN J. NOVOSAD, Primary Examiner

U.S. Cl. X.R.

24—83, 204

PO-1050
(5/69)

UNITED STATES PATENT OFFICE
CERTIFICATE OF CORRECTION

Patent No. 3,503,101     Dated March 31, 1970

Inventor(s) Arpad Kolozsvary

It is certified that error appears in the above-identified patent and that said Letters Patent are hereby corrected as shown below:

Column 3, line 67, "jonied" should read --joined--;

Column 4, line 10, "provides" should read --provide--;

Column 4, line 19, "betwen" should read --between--; and

Claim 6, line 1, "5" should read --4--.

SIGNED AND SEALED

JUL 21 1970

(SEAL)
Attest:

Edward M. Fletcher, Jr.
Attesting Officer

WILLIAM E. SCHUYLER, JR.
Commissioner of Patents